United States Patent
Shen

(10) Patent No.: US 11,057,694 B2
(45) Date of Patent: Jul. 6, 2021

(54) WIRELESS EARPHONE AND WIRELESS EARPHONE AND CHARGING BOX ASSEMBLY

(71) Applicant: Realtek Semiconductor Corp., HsinChu (TW)

(72) Inventor: Chih-Hsiang Shen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/542,232

(22) Filed: Aug. 15, 2019

(65) Prior Publication Data

US 2020/0186909 A1 Jun. 11, 2020

(30) Foreign Application Priority Data

Dec. 6, 2018 (TW) .................................. 107143843

(51) Int. Cl.
*H04R 1/10* (2006.01)
*H02J 7/00* (2006.01)

(52) U.S. Cl.
CPC .......... *H04R 1/1041* (2013.01); *H02J 7/0045* (2013.01); *H04R 1/1025* (2013.01); *H04R 2420/07* (2013.01)

(58) Field of Classification Search
None
See application file for complete search history.

(56) References Cited

U.S. PATENT DOCUMENTS

| 10,129,626 | B1 | 11/2018 | Jung | |
|---|---|---|---|---|
| 2017/0019725 | A1* | 1/2017 | Zhao | H04R 1/1041 |
| 2017/0094392 | A1 | 3/2017 | Zörkendörfer | |
| 2018/0064224 | A1 | 3/2018 | Brzezinski | |
| 2018/0184191 | A1 | 6/2018 | Kim | |
| 2019/0124433 | A1* | 4/2019 | Jo | H04R 1/1025 |

FOREIGN PATENT DOCUMENTS

| CN | 108242839 A | 7/2018 |
|---|---|---|
| JP | 2002-374325 A | 12/2002 |
| JP | 2010-226705 A | 10/2010 |
| JP | 2017-147652 A | 8/2017 |
| KR | 10-2018-0029043 A | 3/2018 |
| KR | 10-1848669 B1 | 5/2018 |
| KR | 10-1885734 B1 | 9/2018 |
| WO | 2010/055576 A1 | 5/2010 |

\* cited by examiner

*Primary Examiner* — Kenny H Truong
(74) *Attorney, Agent, or Firm* — Winston Hsu

(57) ABSTRACT

The present invention provides a wireless earphone, wherein the wireless earphone includes a first pin, a microprocessor and a power management unit, the first pin is arranged to connect to an external charging device, the microprocessor includes a core circuit and a wakeup circuit coupled to the first pin, and the power management unit includes an uninterruptible power area for providing a power to the wakeup circuit. In the operations of the wireless earphone, when the core circuit is at a sleep mode, if the wakeup circuit detects that a voltage level of the first pin changes, the wakeup circuit generates a wakeup signal to wake up the core circuit.

2 Claims, 4 Drawing Sheets

WIRELESS EARPHONE AND WIRELESS EARPHONE AND CHARGING BOX ASSEMBLY

BACKGROUND OF THE INVENTION

1. Field of the Invention

The present invention relates to a wireless earphone.

2. Description of the Prior Art

In a current wireless earphone, a power button is provided for a user to turn on the power of the wireless earphone. However, each time the user needs to use the wireless earphone, for example, when the wireless earphone is taken out from the charging box, the power button needs to be pressed to turn on the wireless earphone, thereby causing inconvenience and trouble to the user.

SUMMARY OF THE INVENTION

It is therefore an objective of the present invention to provide a wireless earphone, which can let most of the components enter a sleep mode when connected to the charging box, and automatically turn on the power when the user removes the wireless earphone from the charging box, so as to be convenient for the user.

According to one embodiment of the present invention, a wireless earphone is disclosed, wherein the wireless earphone comprises a first pin, a microprocessor and a power management unit, the first pin is arranged to connect to an external charging device, the microprocessor comprises a core circuit and a wakeup circuit coupled to the first pin, and the power management unit comprises an uninterruptible power area for providing a power to the wakeup circuit. In the operations of the wireless earphone, when the core circuit is at a sleep mode, if the wakeup circuit detects that a voltage level of the first pin changes, the wakeup circuit generates a wakeup signal to wake up the core circuit.

According to another embodiment of the present invention, a wireless earphone and a charging box assembly is disclosed, wherein the assembly comprises a charging box and a wireless earphone. The charging box comprises a reference voltage pin, a charging voltage pin and a control circuit, wherein the reference voltage pin is arranged to connect to a reference voltage, and the control circuit is arranged to provide a charging voltage to the charging voltage pin. The wireless earphone comprises a first pin, a second pin, a microprocessor and a power management unit, wherein the first pin is used to connect to the reference voltage pin; the second pin is used to connect to the charging voltage pin to receive the charging voltage from the charging box, and the charging voltage received by the second pin is used to charge a battery within the wireless earphone; the microprocessor comprises a core circuit and a wakeup circuit, wherein the wakeup circuit is coupled to the first pin; and the power management unit comprises an uninterruptible power area for providing a power to the wakeup circuit. In the operations of the wireless earphone, when the core circuit is at a sleep mode, if the wakeup circuit detects that a voltage level of the first pin changes, the wakeup circuit generates a wakeup signal to wake up the core circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
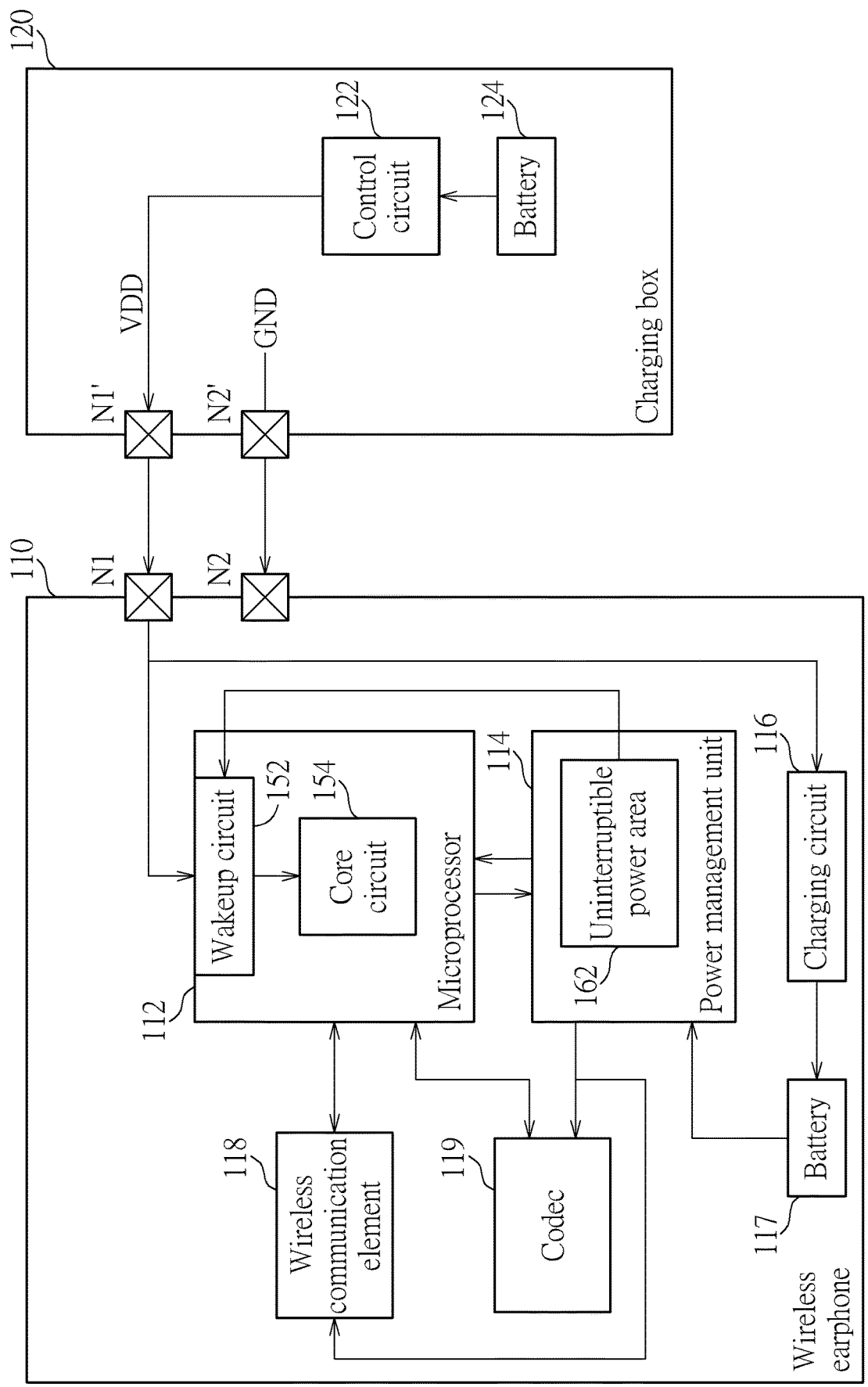
FIG. 1 is a diagram illustrating an electronic device according to one embodiment of the present invention.

FIG. 1 is a diagram illustrating an electronic device according to one embodiment of the present invention. As shown in FIG. 1, the electronic device comprises a wireless earphone 110 and an external charging device (in this embodiment, a charging box 120 serves as the external charging device). The wireless earphone 110 comprises pins N1 and N2, a microprocessor 112, a power management unit 114, a charging circuit 116, a battery 117, a wireless communication element 118 and a codec 119, wherein the microprocessor 112 comprises a wakeup circuit 152 and a core circuit 154, and the power management unit 114 comprises an uninterruptible power area 162. The charging box 120 comprises pins N1' and N2', a control circuit 122 and a battery 124.

In this embodiment, the wireless earphone 110 can let most of the internal components enter the sleep mode when the wireless earphone 110 is put into the charging box 120 and completes the charging operation, and only the uninterruptible power area 162 of the power management unit 114 provides the power to the wakeup circuit 152. In addition, when the user removes the wireless earphone 110 from the charging box 120, the wakeup circuit 152 will automatically control the wireless earphone 110 to enter the normal mode from the sleep mode, so as to be convenient for the user. The detailed operations of the wireless earphone 110 and the charging box 120 are described as follows.

Figure 2:
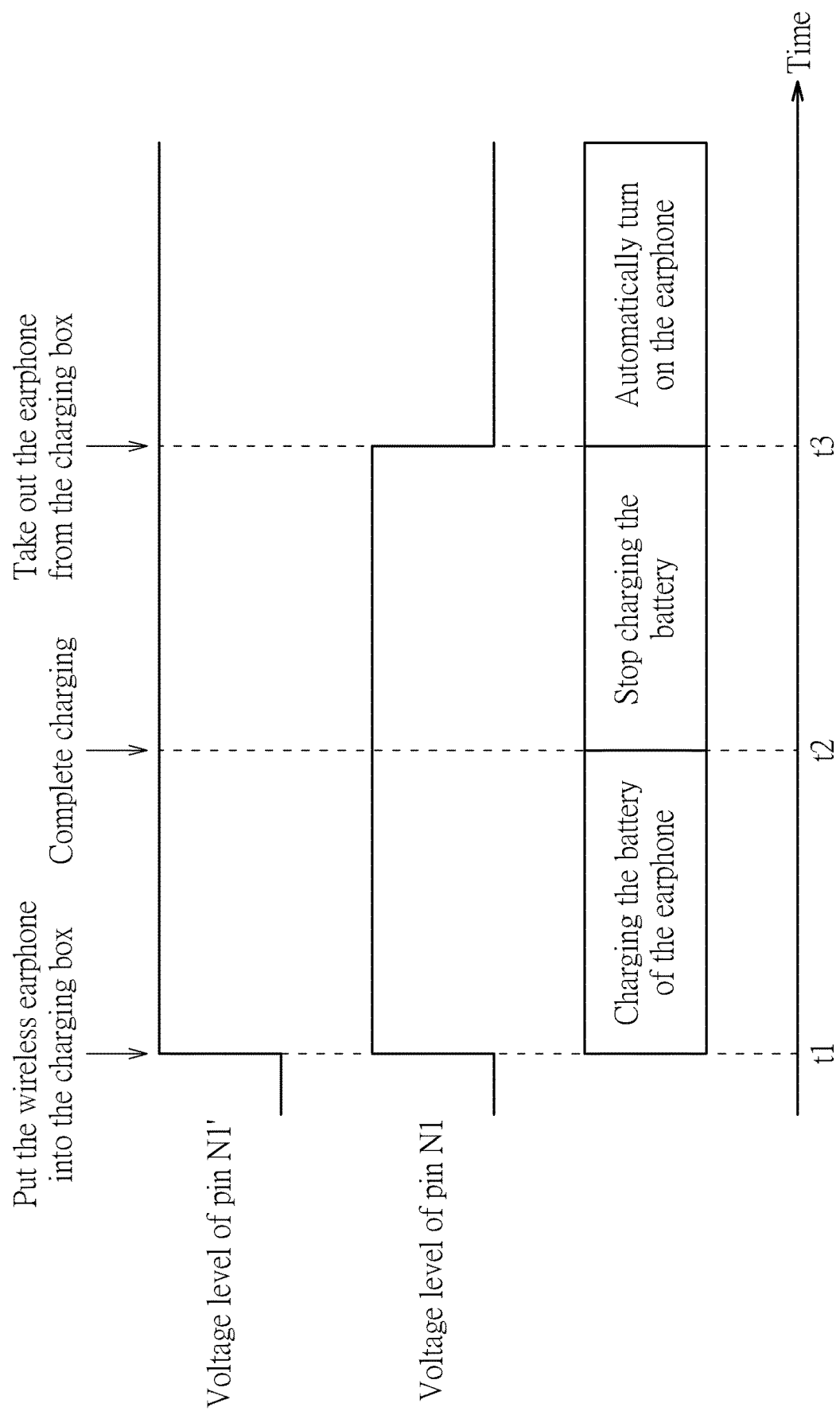
FIG. 2 shows the operations of the wireless earphone and the charging box shown in FIG. 1.

Referring to FIG. 1 and FIG. 2 together, the wireless earphone 110 is placed in the charging box 120 at the time t1. At this time, the pins N1 and N2 of the wireless earphone 110 are respectively connected to the pin N1' and N2' of the charging box 120, wherein the pin N1' of the charging box 120 is used to receive a charging voltage VDD (for example, 5 volts) generated by the control circuit 122 supplied by the battery 124, and the pin N2' is connected to a ground voltage GND. Then, the charging circuit 116 receives the charging voltage VDD from the charging box 120 from the pin N1 at this time, and charges the battery 117.

Then, the battery 117 is fully charged at the time t2, and at this time, the charging circuit 116 stops charging the battery 117. Meanwhile, the core circuit 154, other portions of the power management unit 114, the wireless communication element 118 and the codec 119 will enter the sleep mode after the wireless earphone 110 is fully charged, and only the uninterruptible power area 162 supplies power to the wakeup circuit 152 to maintain its operation.

At time t3, the user takes out the wireless earphone 110 from the charging box 120, that is, the pins N1 and N2 of the wireless earphone 110 are separated from the pins N1' and N2' of the charging box 120, and the wakeup circuit 152 will detect that the voltage level of the pin N1 is lowered from the charging voltage VDD to another voltage level (such as 0V, the ground voltage GND or a voltage value lower than a specific voltage), so that the wakeup circuit 152 generates a wake-up signal to directly or indirectly wake up the core circuit 154. The wakeup circuit 152 also wakes up the power management unit 114 to provide a supply voltage to the microprocessor 112, the wireless communication element 118 and the codec 119. In one embodiment, the wakeup circuit 152 can be a logic circuit, and when the pin N1 is at a low voltage level (for example, 0V, the ground voltage GND, or a voltage value lower than a specific voltage), the output signal can be directly used as the wake-up signal to trigger and wake up the core circuit 154. In addition, the wakeup circuit 152 can also wake up other portions of the power management unit 114 through the wake-up signal or other logic circuits.

After the wireless earphone 110 is automatically turned on, the wireless earphone 110 builds a link with an electronic device, such as a smart phone or a tablet, through the wireless communication element 118, and then receives the audio signal from the electronic device via the wireless communication element 118, and the audio signal is played by the processes of the microprocessor 112 and the codec 119.

As described above, since the user does not need to manually press the power button to turn on the wireless earphone 110 when the wireless earphone 110 is taken out from the charging box 120, the wireless earphone 110 can be directly used to receive audio signal from the electronic device, to greatly increase the convenience of the user. In addition, since the wireless earphone 110 is automatically turned on when taken out from the charging box 120, the wireless earphone 110 may not need a power button, which reduces the manufacturing and design costs.

Figure 3:
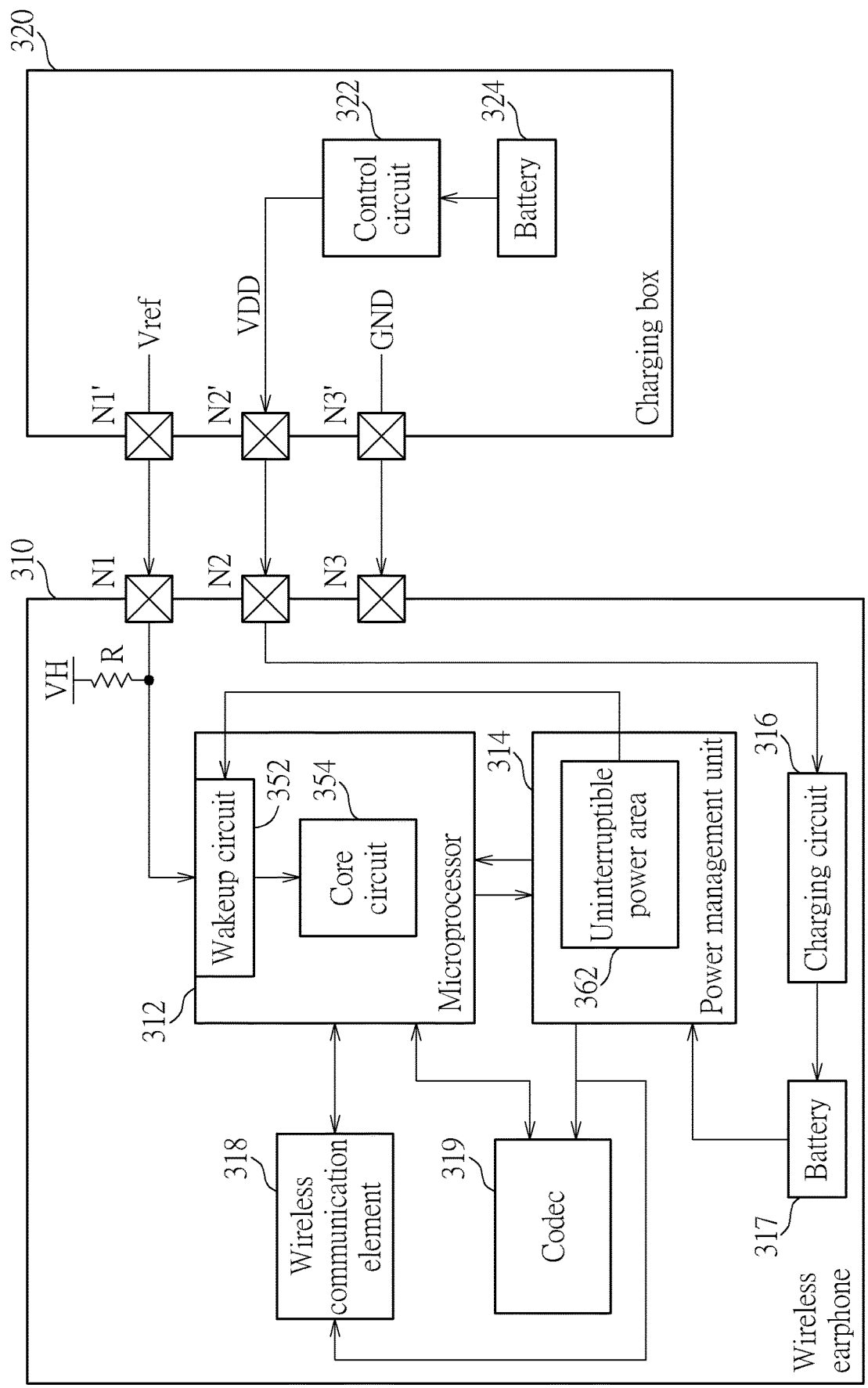
FIG. 3 is a diagram illustrating an electronic device according to another embodiment of the present invention.

FIG. 3 is a diagram illustrating an electronic device according to another embodiment of the present invention. As shown in FIG. 3, the electronic device comprises a wireless earphone 310 and an external charging device (in this embodiment, a charging box 320 serves as the external charging device). The wireless earphone 310 comprises pins N1, N2 and N3, a microprocessor 312, a power management unit 314, a charging circuit 316, a battery 317, a wireless communication element 318 and a codec 319, wherein the microprocessor 312 comprises a wakeup circuit 352 and a core circuit 354, and the power management unit 314 comprises an uninterruptible power area 362. The charging box 120 comprises pins N1', N2' and N3', a control circuit 322 and a battery 324. In this embodiment, the pin N1 and the pin N1' are general-purpose input/output (GPIO) pins, wherein the pin N1 is coupled to a high voltage level (e.g. "VH" shown in FIG. 3) via a pull-up circuit R, and the pin N1' can serve as a reference voltage pin connected to a reference voltage Vref, and the reference voltage Vref has a low voltage level (e.g. ground voltage GND).

In this embodiment, the wireless earphone 310 can let most of the internal components enter the sleep mode when the wireless earphone 310 is put into the charging box 320 and completes the charging operation, and only the uninterruptible power area 362 of the power management unit 314 provides the power to the wakeup circuit 352. In addition, when the user takes out the wireless earphone 310 from the charging box 320, the wakeup circuit 352 will automatically control the wireless earphone 310 to enter the normal mode from the sleep mode, so as to be convenient for the user. The detailed operations of the wireless earphone 310 and the charging box 320 are described as follows.

Figure 4:
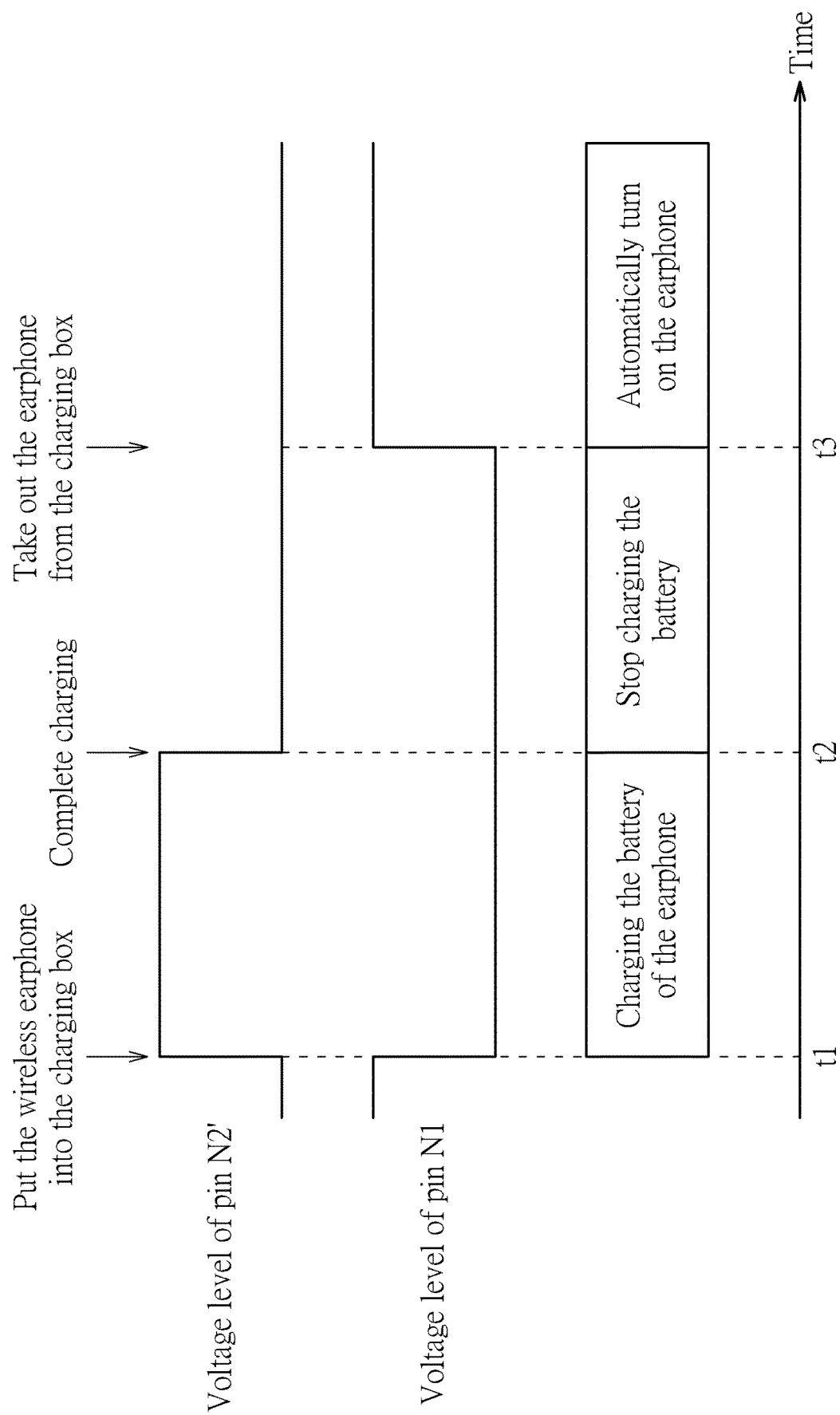
FIG. 4 shows the operations of the wireless earphone and the charging box shown in FIG. 3.

Referring to FIG. 3 and FIG. 4 together, the wireless earphone 310 is placed in the charging box 320 at the time t1. At this time, the pins N1-N3 of the wireless earphone 310 are respectively connected to the pin N1'-N3' of the charging box 320, wherein the pin N2' of the charging box 320 serves as a charging voltage pin that is used to receive a charging voltage VDD (for example, 5V) generated by the control circuit 322 supplied by the battery 324, and the pin N3' is connected to a ground voltage GND. Then, the charging circuit 316 receives the charging voltage VDD from the charging box 320 from the pin N2 at this time, and charges the battery 317.

In this embodiment, because the reference voltage Vref received by the pin N1' has the low voltage level, the pin N1 of the wireless earphone 310 also has the low voltage level.

Then, the battery 317 is fully charged at the time t2, and at this time, the charging circuit 316 stops charging the battery 317. Since the charging circuit 316 stops charging the battery 317, the charging circuit 316 no longer draws current from the pin N2, and the control circuit 322 can turn off the internal boosting circuit for pulling the charging voltage VDD up to 5V after detecting that the pin N2' has no current flowing out, that is, the control circuit 322 stops supplying the charging voltage VDD to the pin N2' to save power consumption. Meanwhile, the core circuit 354, other portions of the power management unit 314, the wireless communication element 318 and the codec 319 will enter the sleep mode after the wireless earphone 310 is fully charged, and only the uninterruptible power area 362 supplies power to the wakeup circuit 352 to maintain its operation.

At time t3, the user takes out the wireless earphone 310 from the charging box 320, that is, the pins N1-N3 of the wireless earphone 310 are separated from the pins N1'-N3' of the charging box 320, and the wake-up circuit 352 detects that the voltage level of the pin N1 is increased from the low voltage level to another voltage level (for example, close to the voltage VH), so that the wakeup circuit 352 generates a wake-up signal to directly or indirectly wake up the core circuit 354. The wakeup circuit 352 also wakes up the power management unit 314 to provide a supply voltage to the microprocessor 312, the wireless communication element 318 and the codec 319. In one embodiment, the wakeup circuit 352 can be a logic circuit, and when the pin N1 is at a high voltage level, the output signal can be directly used as the wake-up signal to trigger and wake up the core circuit 354. In addition, the wakeup circuit 352 can also wake up other portions of the power management unit 314 through the wake-up signal or other logic circuits.

After the wireless earphone 310 is automatically turned on, the wireless earphone 310 builds a link with an electronic device, such as a smart phone or a tablet, through the wireless communication element 318, and then receives the audio signal from the electronic device via the wireless communication element 318, and the audio signal is played by the processes of the microprocessor 312 and the codec 319.

As described above, since the user does not need to manually press the power button to turn on the wireless earphone 310 when the wireless earphone 310 is taken out from the charging box 320, the wireless earphone 310 can be directly used to receive audio signal from the electronic device, to greatly increase the convenience of the user. In addition, since the wireless earphone 310 is automatically turned on when taken out from the charging box 320, the wireless earphone 310 may not need a power button, which reduces the manufacturing and design costs.

It should be noted that in the embodiment of FIG. 3, the reference voltage Vref coupled to the pin N1' of the charging box 320 has the low voltage level, and the pin N1 of the wireless earphone 310 is connected to the high voltage level via the pull-up circuit R, and when the pin N1 is changed from the low voltage level to the high voltage level, the wakeup circuit 352 wakes up the core circuit 354 and the power management unit 314. However, the above embodiment is for illustrative purposes only and it is not a limitation of the present invention. In other embodiments, the reference voltage Vref connected to the pin N1' of the charging box 320 may have a high voltage level, and the pin N1 of the wireless earphone 310 may be connected to a low voltage level through a pull-down circuit, and when the pin N1 is changed from the high voltage level to the low voltage level, the wakeup circuit 352 wakes up the core circuit 354 and the power management unit 314. These alternative designs shall fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless earphone, comprising:
a first pin, for connecting to an external charging device;
a microprocessor comprising a core circuit and a wakeup circuit, wherein the wakeup circuit is coupled to the first pin; and
a power management unit comprising an uninterruptible power area, wherein the uninterruptible power area supplies power to the wakeup circuit;
wherein when the core circuit is in a sleep mode, if the wakeup circuit detects that a voltage level of the first pin changes, the wakeup circuit generates a wake-up signal to wake up the core circuit;
wherein the first pin is used to receive a reference voltage from the external charging device; and when the wireless earphone connects to the external charging device and completes a charging operation, the core circuit enters the sleep mode, but the wakeup circuit maintains its operation by using power from the uninterruptible power area; and when the wireless earphone is taken out from the external charging device, and the wakeup circuit detects that the voltage level of the first pin is lowered or increased from the reference voltage to another voltage level, the wakeup circuit generates the wake-up signal to wake up the core circuit.

2. The wireless earphone of claim 1, wherein when the wireless earphone connects to the external charging device and completes a charging operation, the core circuit and other portion of the power management unit enter the sleep mode, but the wakeup circuit maintains its operation by using power from the uninterruptible power area; and when the wireless earphone is taken out from the external charging device, and the wakeup circuit detects that the voltage level of the first pin is lowered or increased from the reference voltage to another voltage level, the wakeup circuit generates the wake-up signal to wake up the core circuit and the other portion of the power management unit.

* * * * *